(No Model.) 2 Sheets—Sheet 1.
F. WECK.
DRY CENTER VALVE FOR GAS PURIFIERS.
No. 345,559. Patented July 13, 1886.
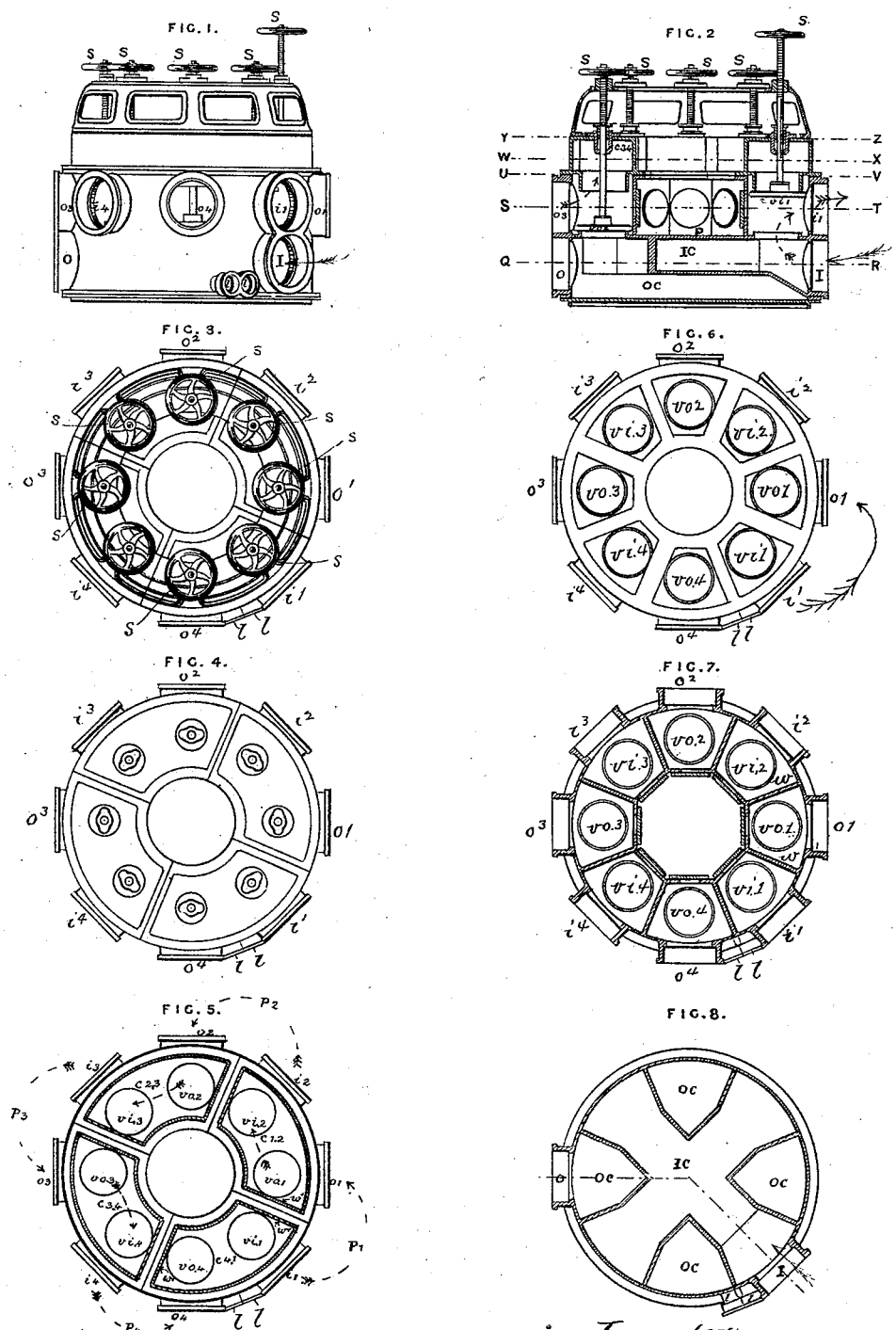
Attest
W. T. Norton.
R. B. Washington.
Inventor
Friedrich Weck.
by John J. Halsted & Son
his Attys.

(No Model.) 2 Sheets—Sheet 2.
F. WECK.
DRY CENTER VALVE FOR GAS PURIFIERS.
No. 345,559. Patented July 13, 1886.
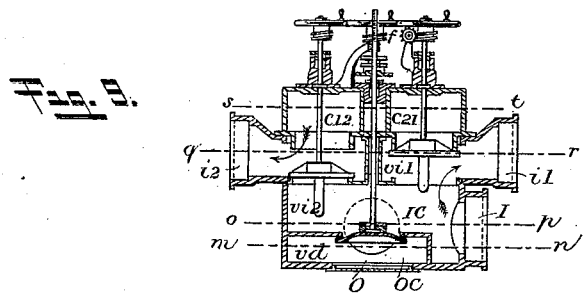
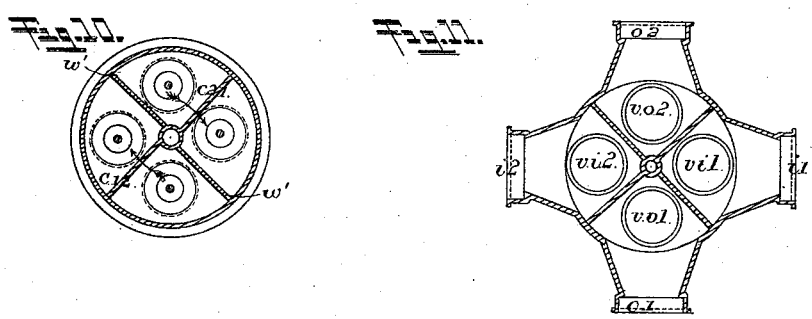
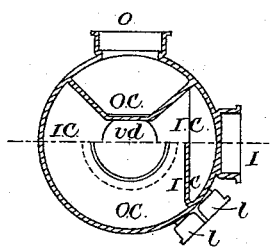
WITNESSES
Will T. Norton.
J. C. Lathrop.
INVENTOR
Friedrich Weck.
By John J. Halsted & Son
his Attorneys.
N. PETERS. Photo-Lithographer, Washington, D. C.

UNITED STATES PATENT OFFICE.

FRIEDRICH WECK, OF LILLESHALL, COUNTY OF SALOP, ENGLAND.

DRY CENTER-VALVE FOR GAS-PURIFIERS.

SPECIFICATION forming part of Letters Patent No. 345,559, dated July 13, 1886.

Application filed December 27, 1884. Serial No. 151,357. (No model.) Patented in Germany January 22, 1882, No. 19,244, and in England June 17, 1882, No. 2,878.

*To all whom it may concern:*

Be it known that I, FRIEDRICH WECK, a subject of the Queen of Great Britain, residing at Lilleshall, in the county of Salop, England, have invented new and useful Improvements in Dry Center-Valves for Gas-Purifiers, of which the following is a specification.

This invention relates to the construction of an improved dry center-valve for working gas-purifiers, whereby the purifiers can be handily changed without turning one main portion of the apparatus on the other, as hitherto, and which shall at the same time be free from the liability to leakage which attends the present form of center-valves.

In carrying out the invention I construct in a common case a central arrangement of a number of disk-valves, the number of which will depend upon that of the purifiers which are to be connected therewith. These valves in a certain manner partly communicate with one another, and are partly shut off from each other.

In order to enable the invention to be better understood, I will proceed to describe the same by reference to the accompanying drawings, in which—

Figure 1 is an elevation, Fig. 2 a vertical section, of the apparatus as used for four purifiers, section taken through main inlet I and main outlet O, (as per dotted line O I in Fig. 8.) Fig. 3 is a plan of the complete center-valve; Fig. 4, a plan or top view, the parts above the line Y Z of Fig. 2 being removed. Fig. 5 is a horizontal section through the upper part or communication-chambers on line W X of Fig. 2; Fig. 6, a plan of the main body of the valve, with the upper part removed, on line U V of Fig. 2; Fig. 7, a horizontal section at the level of center line of pipes communicating with purifiers on line S T of Fig. 2; and Fig. 8 a horizontal section through the lower part on the line Q R of Fig. 2, cutting through the inlet and outlet chambers and the main inlet and outlet sockets I and O. Fig. 9 is a vertical section of a valve for two purifiers, which has, however, an additional by-pass valve, $v\,d$. Fig. 10 is a horizontal section of the same on the line $s\,t$ of Fig. 9; Fig. 11, a horizontal section of the same on the line $q\,r$ of Fig. 9. Fig. 12 shows, at $e$, a half-horizontal section of the same on the line $o\,p$ of Fig. 9, and at $f$ a half-horizontal section of the same on the line $m\,n$ of Fig. 9.

For the purpose of illustration I will describe the valve as applied for working four purifiers, Figs. 1 to 8, inclusive.

Similar letters indicate like parts in all the figures.

The lower chamber, which extends up to the horizontal partition P, is divided into two compartments—viz., one inlet-compartment, I C, and one outlet-compartment, O C, (see Figs. 2 and 8,)—and each of these compartments has at its top four valve-openings. The compartment I C has also the main socket I for the inlet-pipe, and O C has the socket O for the main outlet-pipe. There is also in each compartment the small socket $l$, which serves to abstract the liquid formed by condensation. The middle part, into which the above-named valve-openings lead, and which extends from the partition P to the plane U V, has again in its upper wall exactly similar or corresponding openings, of which each can be blocked or closed by one and the same valve-disk which closes the one below it. This middle part is divided into eight chambers by the eight radial walls, $w$, Fig. 7, and each of these chambers has thus a valve-opening above and one below, and also the socket opening outward for connection with the purifiers $i\,1\,i\,2\,i\,3\,i\,4$ and $o\,1\,o\,2\,o\,3\,o\,4$, of which those marked $i$ are inlets, and those marked $o$ outlets, from the purifiers. The upper chamber, from plane U V to Y Z, is divided by radial walls $w'$ into four portions, each of which has thus two of the valve-openings in its bottom, and thus form the connection between the outlet of one purifier to the inlet of the next one. The valve-disks are pulled up or pressed down by screws $s$. When they are up, they close the upper openings, and when down they close the lower ones, and their position can be ascertained from the outside by the projecting screw, or, if internal screws are used, by means of a suitable index, as shown in the drawings of the valve for two purifiers. (See Fig. 9.) I is the main inlet, and O the main outlet, by which the main of the gas-works is connected to the valve. The other eight sockets, or inlets and outlets, lying at one level, (see Fig. 7,) are for connecting the valve with the purifiers, and they are so arranged that the four sockets *i* 1 *i* 2 *i* 3 *i* 4, which communicate with the chambers that below lead to the part I C, lead to the inlet of the purifiers, and the other alternate sockets *o* 1 *o* 2 *o* 3 *o* 4, which lead to the outlet-chamber O C, are connected with the outlets from the purifiers. The four communication-chambers above, *c* 1 2 *c* 2 3 *c* 3 4 *c* 4 1, serve to make connection (when the valve-disks are down) between the outlets of the purifiers and the inlets of the next following purifiers; thus *c* 1 2 connects the outlet of purifier 1 with the inlet of purifier 2, and so on. The inlets and outlets of the same purifiers are separated by the radial walls *w'*, as shown in Fig. 5. When one of the lower valve-openings is closed, the upper one is open, and, vice versa, when upper one is closed the lower one is open. If the valve be now set to work, the gas enters through the main inlet I into the inlet-compartment I C of the lower chamber, and thence through any one of the four valve-openings above which happens to be open. (See Figs. 2 and 8.) Up to this time, supposing the whole eight lower openings to have been shut and one be now open—viz., 1—(see Fig. 2,) the gas will pass to the first purifier, the position being indicated by P', through the inlet *i'*, Figs. 2 and 5, and returning it enters the valve again through O', Fig. 5. If the lower opening of the next valve *v o* 1 be opened by pulling the disk up, the gas passes down into the outlet-compartment O C and leaves the valve through the socket or main outlet O. In this manner only one purifier has been worked. If it be desired to add the second purifier, the valve *v o* 1 is let down—that is, the lower opening of *v o* 1 is closed and at the same time the upper one is opened, and then the gas rises into the communicating chamber *c* 1 2 (after returning from the first purifier) and goes down through *v i* 2, which is open above through *i* 2 into the second purifier. If the next disk *v o* 2 be now pulled up, the gas on its return from the second purifier will pass down into the outlet-compartment O C and leave the valve. A similar proceeding takes place when putting on the third purifier—that is, the valve *v o* 3 is pulled up and *v o* 2 is let down, and to put on the fourth purifier *v o* 4 is pulled up and *v o* 3 let down. It will be easily seen how a purifier is shut off, viz: To shut off No. 1 purifier the valve *v i* 2 is pulled up and *v i* 1 let down, and the gas will then pass through the purifiers 2, 3, and 4.

It will be easily seen how a purifier may be shut off, viz: If it be required to shut off No. 1 purifier, the valve *v i* 2 must be pulled up and the valve *v i* 1 be let down, and the gas will then pass up through the valve-opening *v i* 2, through *i* 2 and through the purifiers 2, 3 and 4.

It will be clear that by leaving out one pair of valves and sockets, the same apparatus will be applicable to three purifiers, and by leaving out two pairs I obtain the construction for two purifiers. This latter is illustrated in Figs. 9, 10, 11, and 12, with the difference that in the drawings there is added a disk by-pass valve, *v d*, by means of which the compartments of the lower chambers, I C and O C, can be made to communicate, and the gas can go right through the valve without having first to pass through any one of the purifiers, a proceeding which would be impossible without this valve; but the apparatus can be constructed either with or without this by-pass valve, as may be desired, as it is not absolutely necessary, but desirable.

Among the advantages of the improved center-valve may be mentioned the following: There is no fear of leakage through the surfaces springing, as the joint is made with a soft metal and is not large. The purifiers 1, 2, 3, or 4 can always be worked in the same order. When adapted for three purifiers, it almost renders them as effective as four purifiers with the ordinary center-valve now in use, as the dirty one, after having been fully charged, can be put on again without turning the first one off, and if with four purifiers it allows of a more thorough using up of the foul lime or other material in the first purifier. During changing no foul gas can pass directly into the main outlet, as is now the case with the ordinary center-valves, without going through a purifier. There are no liquor-pipes inside to get stopped up. The top part can be made in four pieces. The valve is a little larger in diameter than the ordinary center-valve, but shallower, and should not cost any more to make. In working it is only necessary to bear in mind that the inlet-valve to the first purifier and the outlet-valve from the last purifier are up, all the rest being down. Care should also be taken that one valve is opened before another is closed.

I have shown my invention as applied to a round casing; but it is evident that it may be applied to one of oval, rectangular, or any other suitable shape.

It will be evident that the case which contains the valves need not necessarily be cylindrical or round, but it may be oval, rectangular, or of any other suitable form.

I do not claim, broadly, a center-seal provided with disk-valves; but

What I do claim, and desire to secure by Letters Patent, is—

1. In combination, the casing provided with horizontal partitions having valve-openings, and the disk-valves arranged between the partitions for closing or opening the valve-openings above and below, and means for operating such valves, all as set forth.

2. The described lower portion of the central apparatus, the same having the two compartments—viz., one inlet-compartment, I C, and one outlet-compartment, O C—and each of these having four valve-openings, all the inlets to the purifiers being adapted to communicate with the inlet-chamber, and all the outlets from the purifiers being adapted to communicate with the outlet-chamber, the said lower portion of the apparatus being fixed relatively to and not turning on its adjacent portion, all as set forth.

3. The horizontal-disk by-pass valve $v\ d$, located, as described, in the horizontal partition separating the inlet and outlet compartments of the lower chamber, and whereby these compartments may be made to communicate, all as set forth.

4. A center-valve for working gas-purifiers, having three horizontal chambers, one above the other, the lowest one of which is divided into a main inlet and a main outlet compartment, a series of valve-openings leading from the lowest chamber to the chamber above, a second series of valve-openings corresponding with and immediately over the lower set of openings and leading into the uppermost chambers, a series of valves each of which has a single disk adapted to close its corresponding upper opening when raised and the lower opening when lowered, and a series of inlet and outlet sockets for connecting the purifiers with the middle chamber, all as set forth.

F. WECK.

Witnesses:
  E. G. S. CORSER,
    *Solicitor, Shrewsbury.*
  G. W. FERRINGTON,
    *Articled Clerk 7, Shrewsbury.*